United States Patent
Holz et al.

(10) Patent No.: US 9,622,410 B2
(45) Date of Patent: Apr. 18, 2017

(54) MATERIAL COLLECTION PARKING SYSTEM

(71) Applicant: DEERE & COMPANY, Moline, IL (US)

(72) Inventors: William J Holz, Hartford, WI (US); Christopher Krajnik, Eden Prairie, MN (US); Patrick Shaver, Eden Prairie, MN (US)

(73) Assignee: DEERE & COMPANY, Moline, IL (US)

( * ) Notice: Subject to any disclaimer, the term of this patent is extended or adjusted under 35 U.S.C. 154(b) by 63 days.

(21) Appl. No.: 14/199,050

(22) Filed: Mar. 6, 2014

(65) Prior Publication Data

US 2015/0250099 A1 Sep. 10, 2015

(51) Int. Cl.
  *A01D 43/063* (2006.01)
  *A01D 34/00* (2006.01)
  *A01D 101/00* (2006.01)

(52) U.S. Cl.
  CPC .......... *A01D 43/063* (2013.01); *A01D 34/00* (2013.01); *A01D 2101/00* (2013.01)

(58) Field of Classification Search
  CPC .. A01D 43/06; A01D 43/063; A01D 43/0631; A01D 43/0633; A01D 43/0635; A01D 43/0638; A01D 43/07; A01D 43/073; A01D 43/077; A01D 43/0775; A01D 43/086; A01D 34/49; A01D 42/04; A01D 34/00
  See application file for complete search history.

(56) References Cited

U.S. PATENT DOCUMENTS

| | | | | |
|---|---|---|---|---|
| 4,476,668 A * | 10/1984 | Reilly | ............. | 56/202 |
| 4,523,788 A * | 6/1985 | Prasad | ............. | 298/11 |
| 5,218,737 A * | 6/1993 | Dansby et al. | ............. | 15/347 |
| 6,012,273 A * | 1/2000 | Ogasawara et al. | ............. | 56/16.6 |
| 6,029,312 A * | 2/2000 | Whitney | ............. | 15/347 |
| 6,050,072 A * | 4/2000 | Chabrier et al. | ............. | 56/202 |
| 7,448,691 B2 * | 11/2008 | Brooks | ............. | 298/17 T |

(Continued)

FOREIGN PATENT DOCUMENTS

| | | | |
|---|---|---|---|
| DE | 4113828 A1 | 10/1992 | |
| EP | 1138187 A1 * | 10/2001 | ............. A01D 34/71 |

(Continued)

OTHER PUBLICATIONS

Dr. Commercial Leaf and Lawn.pdf, 2007, Country Home Products.*

(Continued)

*Primary Examiner* — Alicia Torres
*Assistant Examiner* — Adam Behrens (57) ABSTRACT

A material collection parking system having a hopper connected to a rear discharge chute from a mower deck on a lawn tractor. The system includes a pair of front and a pair of rear parking support legs, at least one of the pairs of legs being independently moveable between a stowed position along a side wall of the hopper and a deployed position supporting the hopper on a ground surface. The material collection system has a low dump configuration and a high dump configuration providing unobstructed sight lines and rear visibility for the operator during rear collection in the stowed position on the lawn tractor.

3 Claims, 10 Drawing Sheets

(56) References Cited

U.S. PATENT DOCUMENTS

| | | | |
|---|---|---|---|
| 7,665,285 B1* | 2/2010 | Harada et al. | 56/16.6 |
| 7,730,706 B2* | 6/2010 | Ogata et al. | 56/203 |
| 7,992,373 B2* | 8/2011 | Ogata et al. | 56/202 |
| 2001/0025472 A1* | 10/2001 | Maurizio et al. | 56/14.7 |
| 2002/0083694 A1* | 7/2002 | Nagai et al. | 56/16.8 |
| 2004/0079063 A1* | 4/2004 | Ishimori | 56/205 |
| 2006/0177292 A1* | 8/2006 | Walker | 414/422 |
| 2009/0282797 A1 | 11/2009 | Ogata et al. | |
| 2011/0197560 A1* | 8/2011 | Suhara | 56/202 |

FOREIGN PATENT DOCUMENTS

| | | | | |
|---|---|---|---|---|
| EP | 1882406 A1 * | 1/2008 | | A01D 43/063 |
| EP | 2559333 A1 | 2/2013 | | |
| EP | 2870855 A1 | 5/2015 | | |
| JP | 2002101722 A | 4/2002 | | |

OTHER PUBLICATIONS

Search Report issued in GB counterpart application No. 1502333.6, dated Aug. 6, 2015 (6 pages).
German Search Report issued in counterpart application No. 102015203204.3, dated Jan. 27, 2016 (10 pages).

* cited by examiner

MATERIAL COLLECTION PARKING SYSTEM

FIELD OF THE INVENTION

This invention relates to mowing machines for cutting grass and other vegetation, and more specifically to a material collection parking system for use with a lawn tractor.

BACKGROUND OF THE INVENTION

Lawn tractors and other grass mowing machines may have rear discharge/rear collection mower decks connected to material collection systems in which the blades throw cut grass clippings into a discharge and collection chute directed to a rear mounted collection container or hopper. Some material collection systems may include mechanisms designed to dump grass clippings from the collection container or hopper, in either a low dump configuration, or a high dump configuration (raised above the lawn tractor). Removal, storage and installation of material collection systems on lawn tractors can be difficult and time intensive because of the size and weight of these systems.

U.S. Pat. No. 7,992,373 entitles Lawn Mower with Grass Collecting Unit Support relates to a grass collecting unit that may be moved between a lowered grass collecting position and a high dump grass discharge position. The support includes left and right masts or vertical main frames extending substantially higher than the top of the operator seat in the grass discharging state, and a vertical pair of lift links extending rearwardly from the upper end portion of each mast or vertical main frame. A hydraulic lift cylinder extends between a lower portion of each mast or vertical main frame and the lower link of each vertical pair of lift links. The vehicle includes left and right support members, with each support member having an upper pin receiving opening and a lower pin receiving opening. Each lower pin receiving opening has a cutout profile in the form of a U-letter as viewed from a lateral side of the mower, with the parking support legs of the U-letter inclined rearward and upward. The grass collecting unit may be attached to the support members by lowering the support frame assembly and guiding a fixing connecting pin along the inclined parking support legs of the U-letter of the cutout profile. The grass collecting unit may be supported by a stand unit having a front stand body and a rear stand body that may be vertically pivoted about axes of connecting shafts between a stored position in which the stand unit extends under the bottom surface of the grass container and a use position in which the stand unit extends downwardly of the grass container. A connecting rod is attached to the front stand body and the rear stand body for interconnecting intermediate portions thereof.

There is a need for a material collection parking system having a low dump configuration, and a high dump configuration that provides unobstructed sight lines and rear visibility for the operator during rear collection on the lawn tractor. There is a need for a material collection parking system that is simple to move between a stowed position and a deployed position, and having a support unit that is easy to access and use.

SUMMARY OF THE INVENTION

A material collection parking system having a hopper connected to a rear discharge chute from a mower deck on a lawn tractor. The system includes a pair of front and a pair of rear parking support legs, at least one of the pairs of legs being independently moveable between a stowed position along a side wall of the hopper and a deployed position supporting the hopper on a ground surface. In one embodiment, the rear discharge chute extends to a front panel hinged to a top front portion of the hopper and removably attached to a rear bracket on the lawn tractor. A lift cylinder connected to a top front portion of the hopper and retracting and extending to pivot the hopper toward and away from the front panel. In another embodiment, the material collection parking system includes a pair of masts removably attached to the lawn tractor behind the operator seat, and a pair of boom arms supporting the hopper, each boom arm pivotably attached to one of the masts at a vertical position below the top of the operator seat; a lift cylinder having a forward end attached to each mast below the boom arm and a rearward end attached to one of the boom arms.

The material collection parking system has a low dump configuration and a high dump configuration providing unobstructed sight lines and rear visibility for the operator during rear collection on the lawn tractor. The material collection parking system is simple to move between a stowed position and a deployed position, and includes parking support legs that is easy to access and use.

DESCRIPTION OF THE PREFERRED EMBODIMENT

Figure 1:
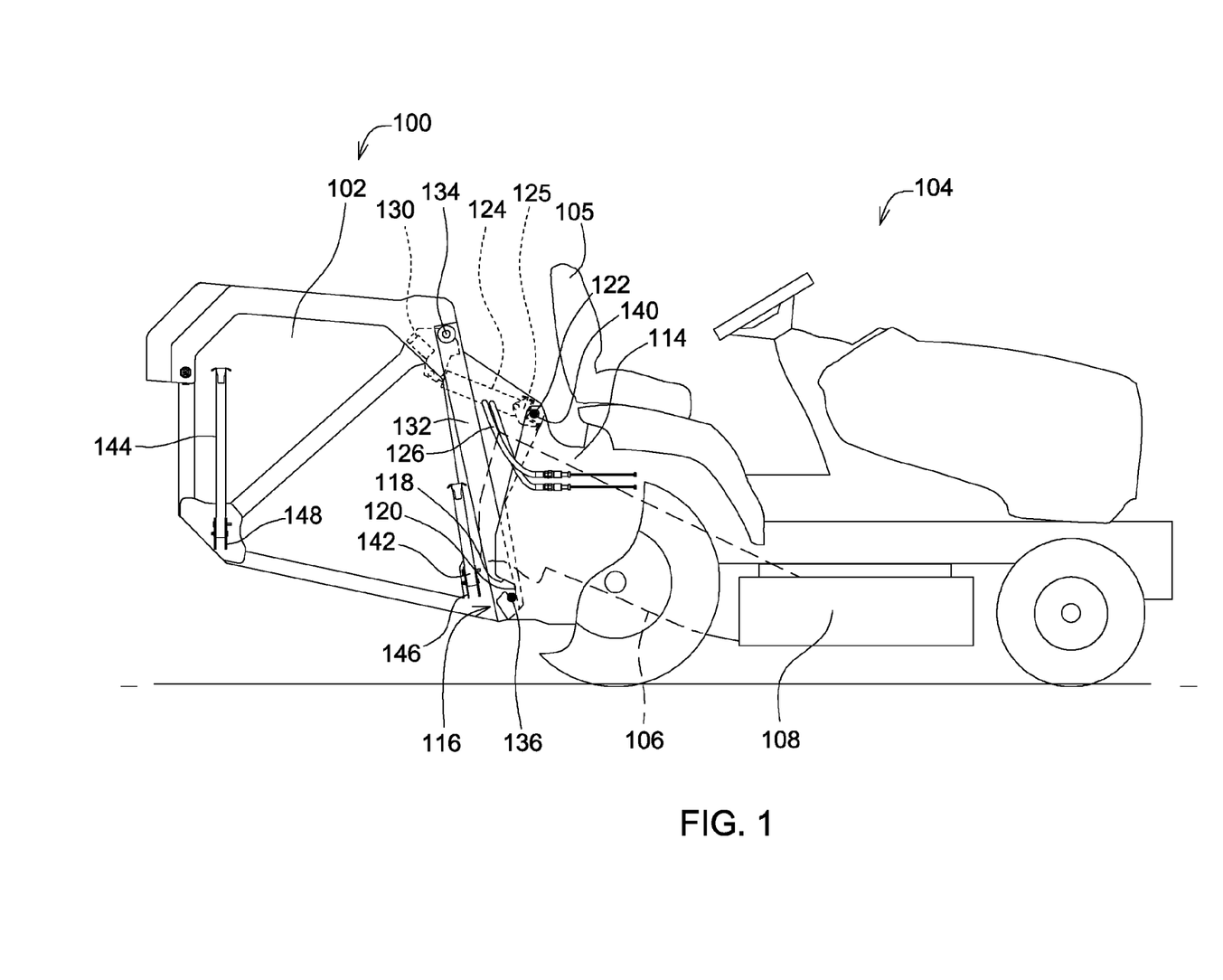
FIG. 1 is a side view of a first embodiment of a material collection parking system in a stowed position.
Figure 2:
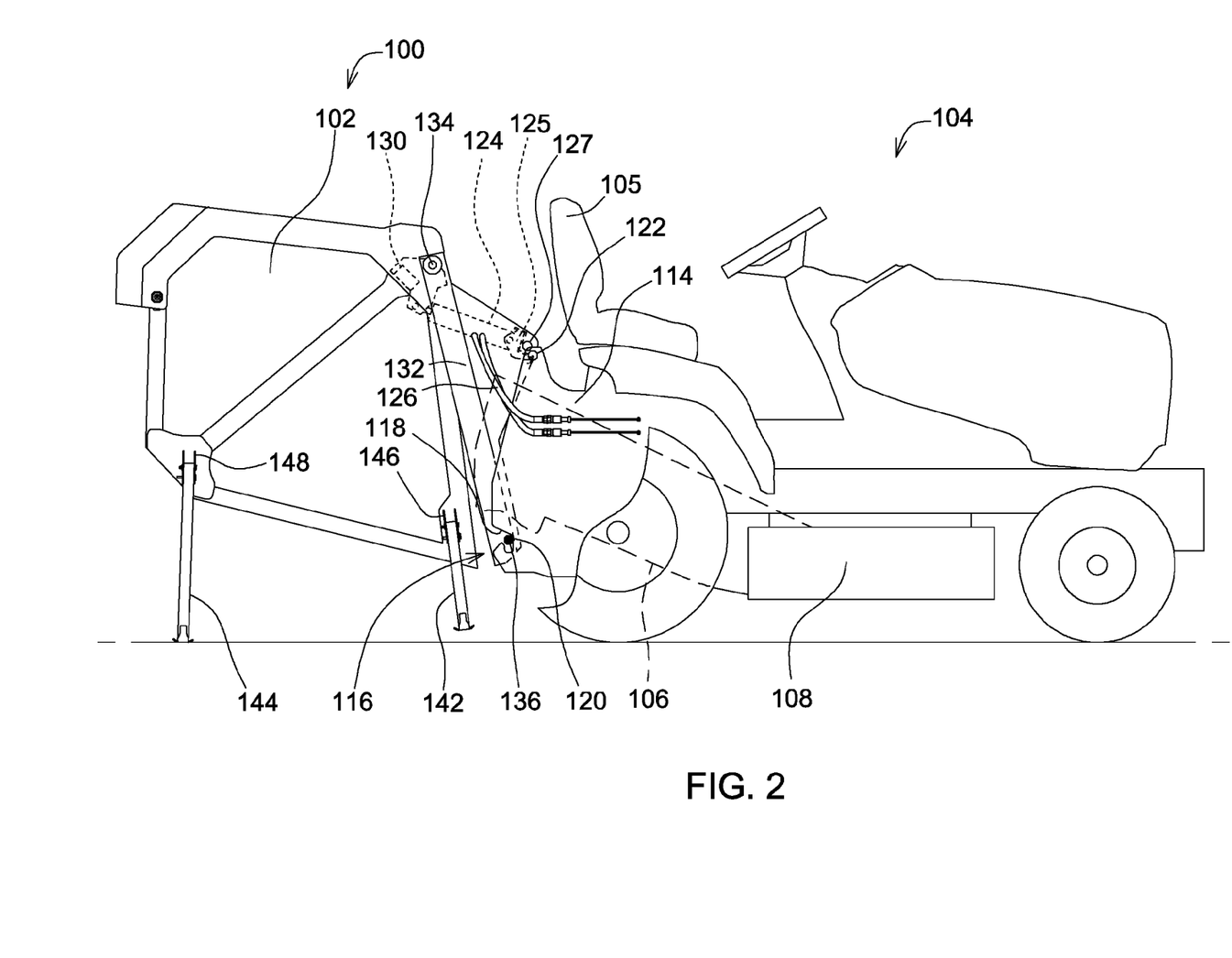
FIG. 2 is a side view of a first embodiment of a material collection parking system between a stowed position and a deployed position.
Figure 3:
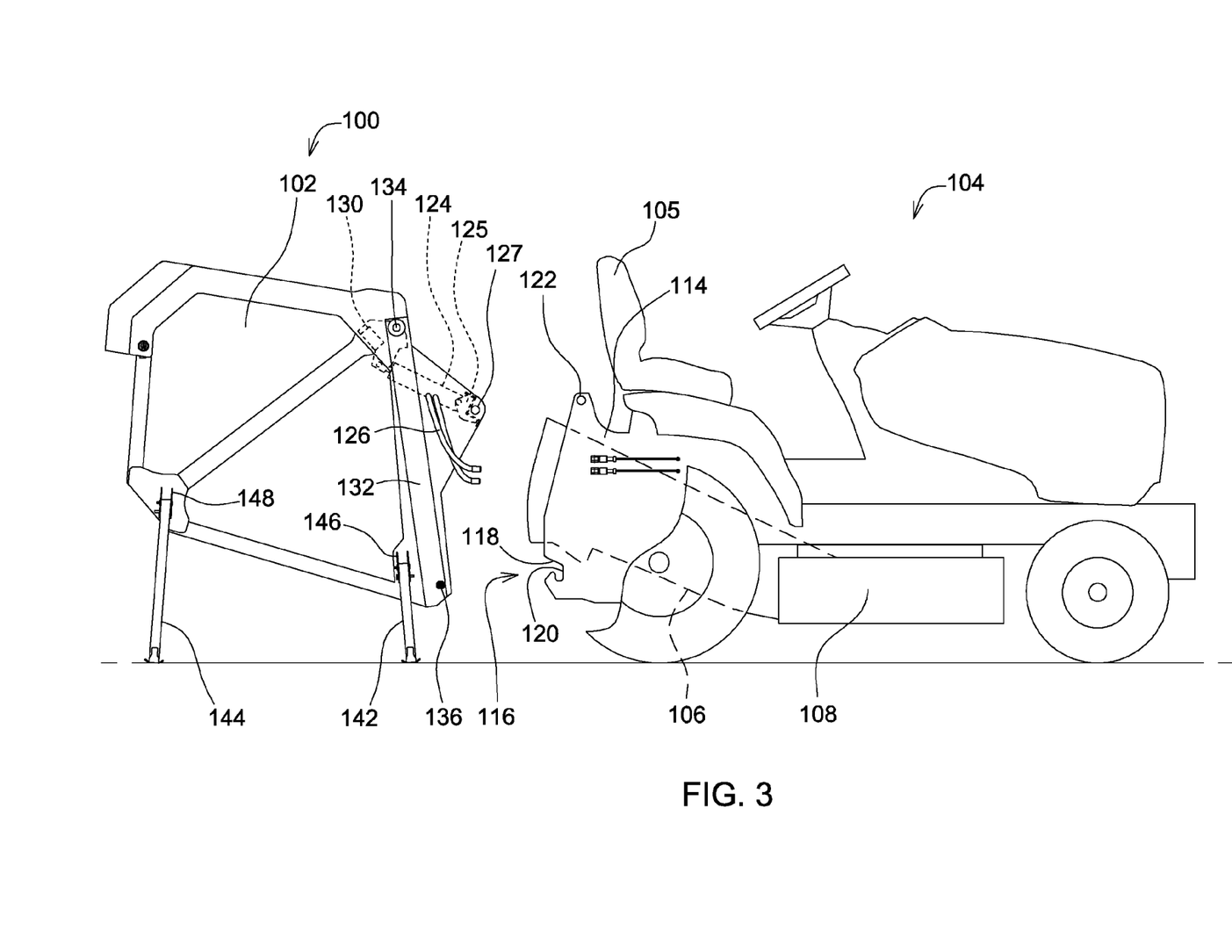
FIG. 3 is a side view of a first embodiment of a material collection parking system in a deployed position.

FIGS. 1-3 show a first embodiment of material collection parking system 100 having a low dump configuration. The material collection parking system may include hopper 102 that may be attached to and removed from lawn tractor 104 having operator seat 105. The lawn tractor may include discharge chute 106 that extends rearwardly from mower deck 108 into hopper 102.

In a first embodiment, material collection parking system 100 may include lift cylinder 124 connected to hydraulic hoses 126 and actuated by operator controls. A forward end of the lift cylinder may be pivotably attached to support 125. Support 125 may be removably attached to rear bracket 114 that may be bolted or welded to a rear frame portion of the lawn tractor. A rearward end of the lift cylinder may be pivotably attached to upper frame member 130 at the top front of the hopper. The controls may be used to extend the lift cylinder to dump the hopper, and to retract the lift cylinder to move the hopper back into the stowed position for grass collection.

In a first embodiment, material collection parking system 100 may include front panel 132 mounted with hinges 134 to the top front of the hopper. Discharge chute 106 may extend into an opening in the front panel. Left and right lower pins or transverse rods 136 may be provided at a lower portion of the front panel, and the rods may be captured in left and right J-shaped slots 116 on a lower portion of the rear bracket. Each J-shaped slot may have a rear facing portion 118 and a vertical portion 120. To secure the front panel of the hopper to the lawn tractor in the stowed position, the lawn tractor may back up until the rods are in the rear facing portion of J-shaped slots 116, and then the hopper may be lowered until the rods are at the bottom of the vertical portion 120 of the J-shaped slots 116. Additionally, the front panel may be secured to the lawn tractor in the stowed position by left and right upper pins 140 inserted through left and right holes 122 through an upper part of the rear bracket, and left and right holes 127 provided in support 125 attached to the front end of the lift cylinder.

Figure 7:
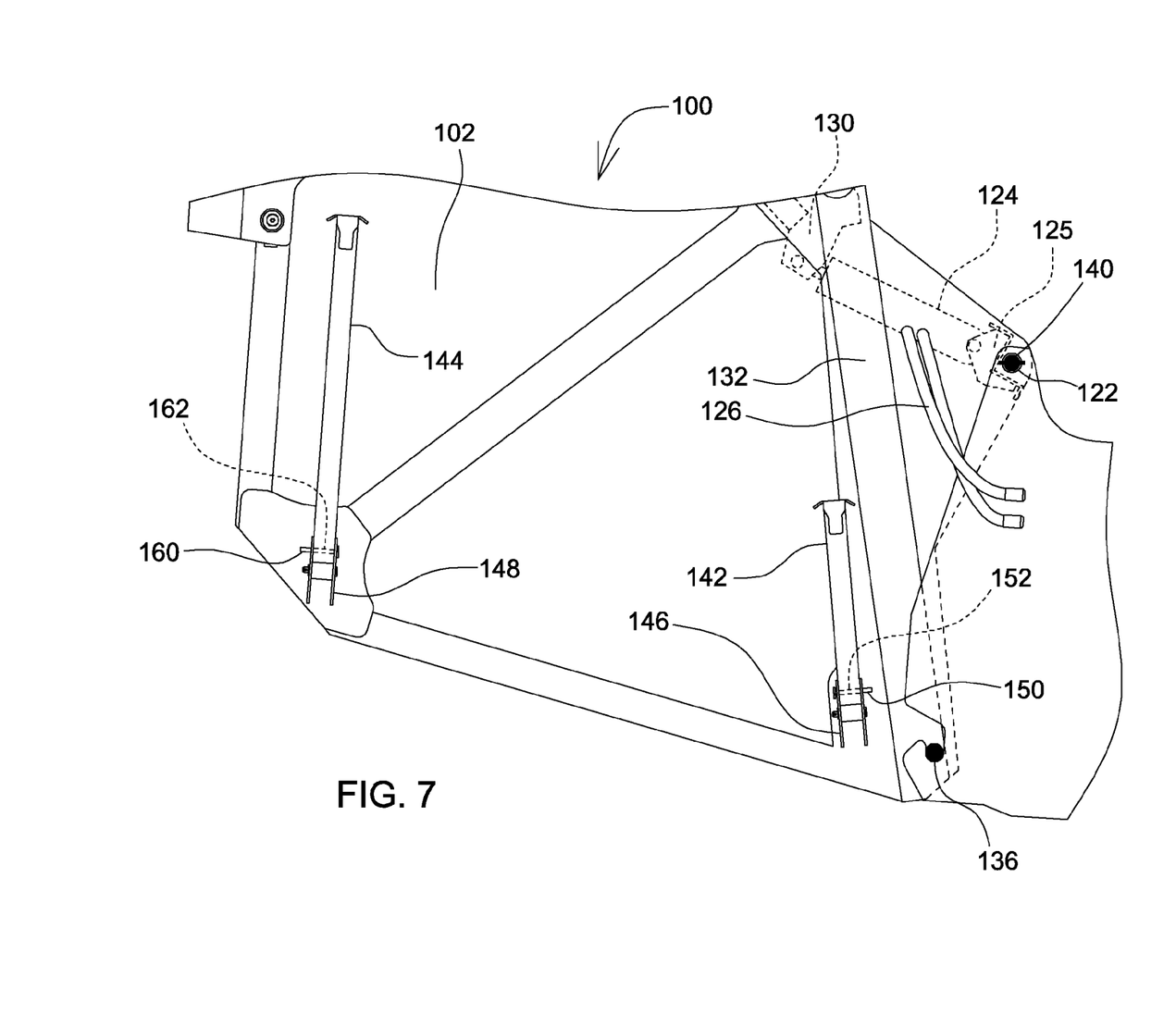
FIG. 7 is a side view showing a lower portion of a first embodiment the material collection parking system in a stowed position.
Figure 8:
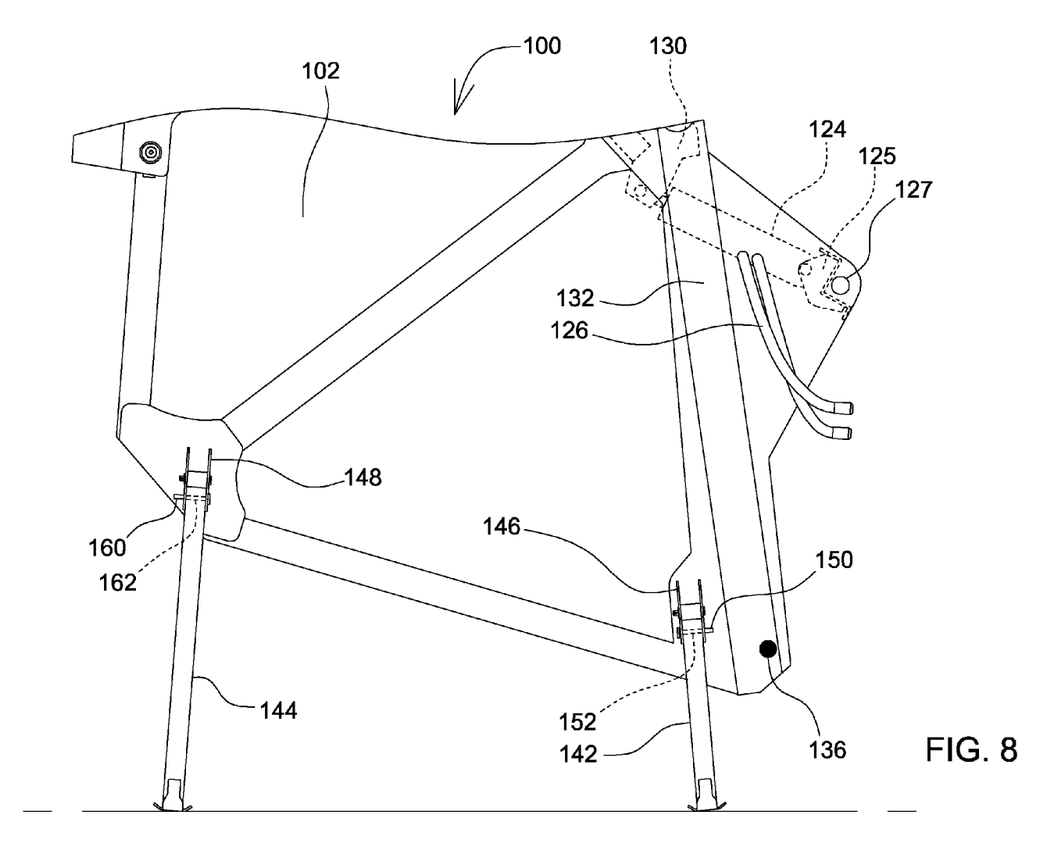
FIG. 8 is a side view showing a lower portion of a first embodiment the material collection parking system in a deployed position.

As shown in FIGS. 7-8, a first embodiment of material collection parking system 100 may include left and right front parking support legs 142 and left and right rear parking support legs 144 attached to the hopper. The front and rear parking support legs may be pivoted 180 degrees between a stowed position against the hopper's left and right side walls, and a deployed position extending down from the hopper side walls to the ground surface. The front and rear parking support legs may be mounted to the hopper side walls with hinge brackets 146, 148. Each front leg may be held in the stowed position of FIG. 7 by inserting pin 150 in hole 152 in the front leg and upper holes in the hinge bracket. Each front leg may be held in the deployed position of FIG. 8 by inserting pin 150 in hole 152 in the front leg and lower holes in the hinge bracket. Each rear leg may be held in the stowed position of FIG. 7 by inserting pin 160 in hole 162 in the rear leg and upper holes in the hinge bracket. Each rear leg may be held in the deployed position of FIG. 8 by inserting pin 160 in hole 162 in the rear leg and lower holes in the hinge bracket. Alternatively, the parking support legs may slide between a stowed position and a deployed position.

In a first embodiment, material collection parking system 100 may be moved between a stowed position in a low dump configuration on a lawn tractor as shown in FIG. 1, and a deployed position off the lawn tractor as shown in FIG. 3. First, lift cylinder 124 may be extended to open and pivot hopper 102 away from front panel 132 in the dump position. With the hopper in the dump position, pins 150, 152 may be removed from the front and rear parking support legs. The front and rear parking support legs may be pivoted 180 degrees away from the hopper side walls, and the pins may be reinserted. The lift cylinder then may be retracted to pivot and lower the hopper back towards the front panel until rear parking support legs 144 contact the ground surface. Upper pins 140 then may be removed from holes 122 in the upper part of the rear bracket and holes 138 in support 125. Lift cylinder 124 then may be extended to move the hopper away from the front panel until the front parking support legs contact the ground surface, as shown in FIG. 2. The lift cylinder then may be extended until lower pins 136 are raised from the bottom to the upper end of the vertical portion 120 of the J-shaped slots. The operator then may drive the lawn tractor forward to remove pins 136 out through the rear facing portion 118 of the J-shaped slots. The lift cylinder then may be retracted to close the panel, and the hydraulic hoses then may be disconnected.

Figure 4:
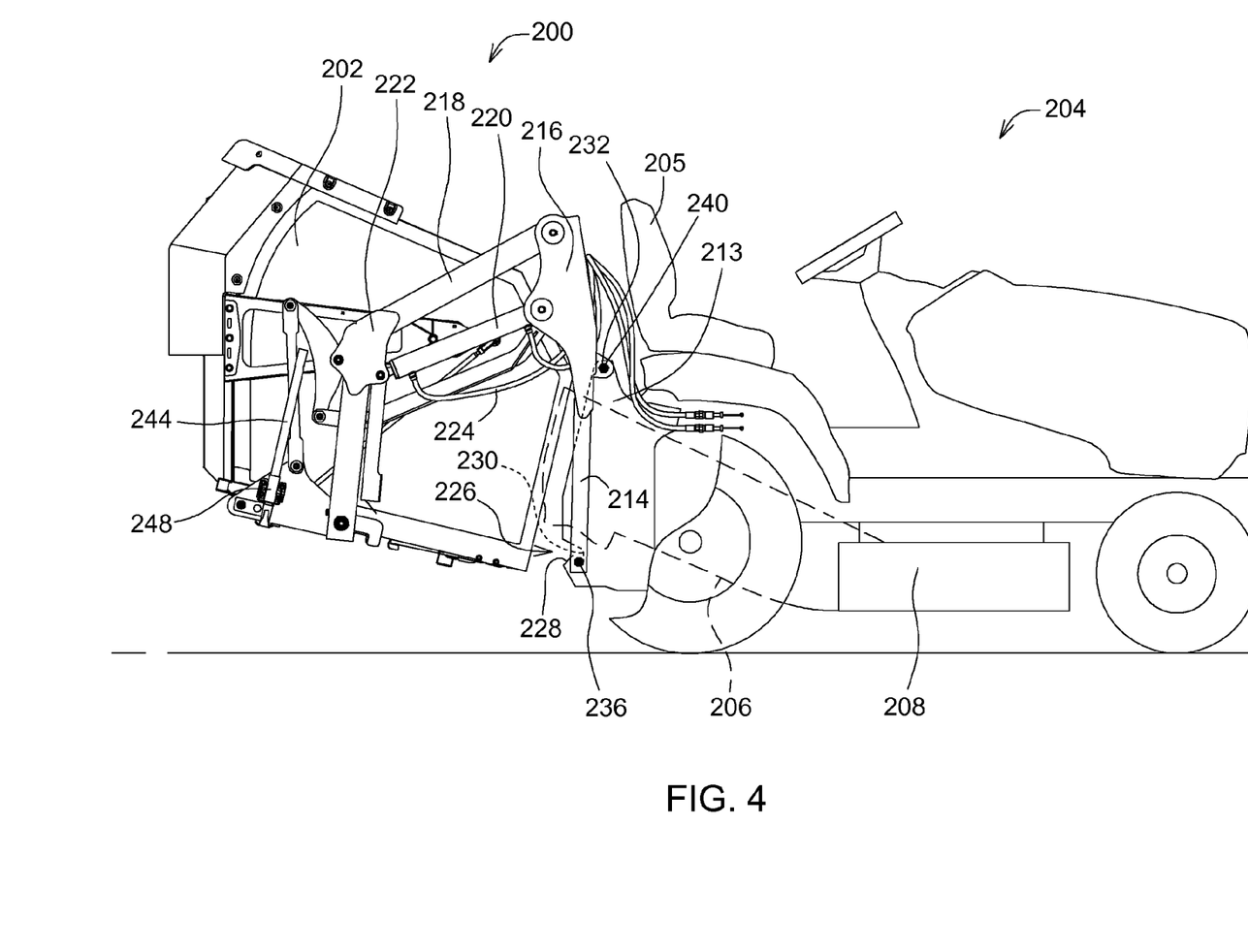
FIG. 4 is a side view of a second embodiment of a material collection parking system in a stowed position.
Figure 5:
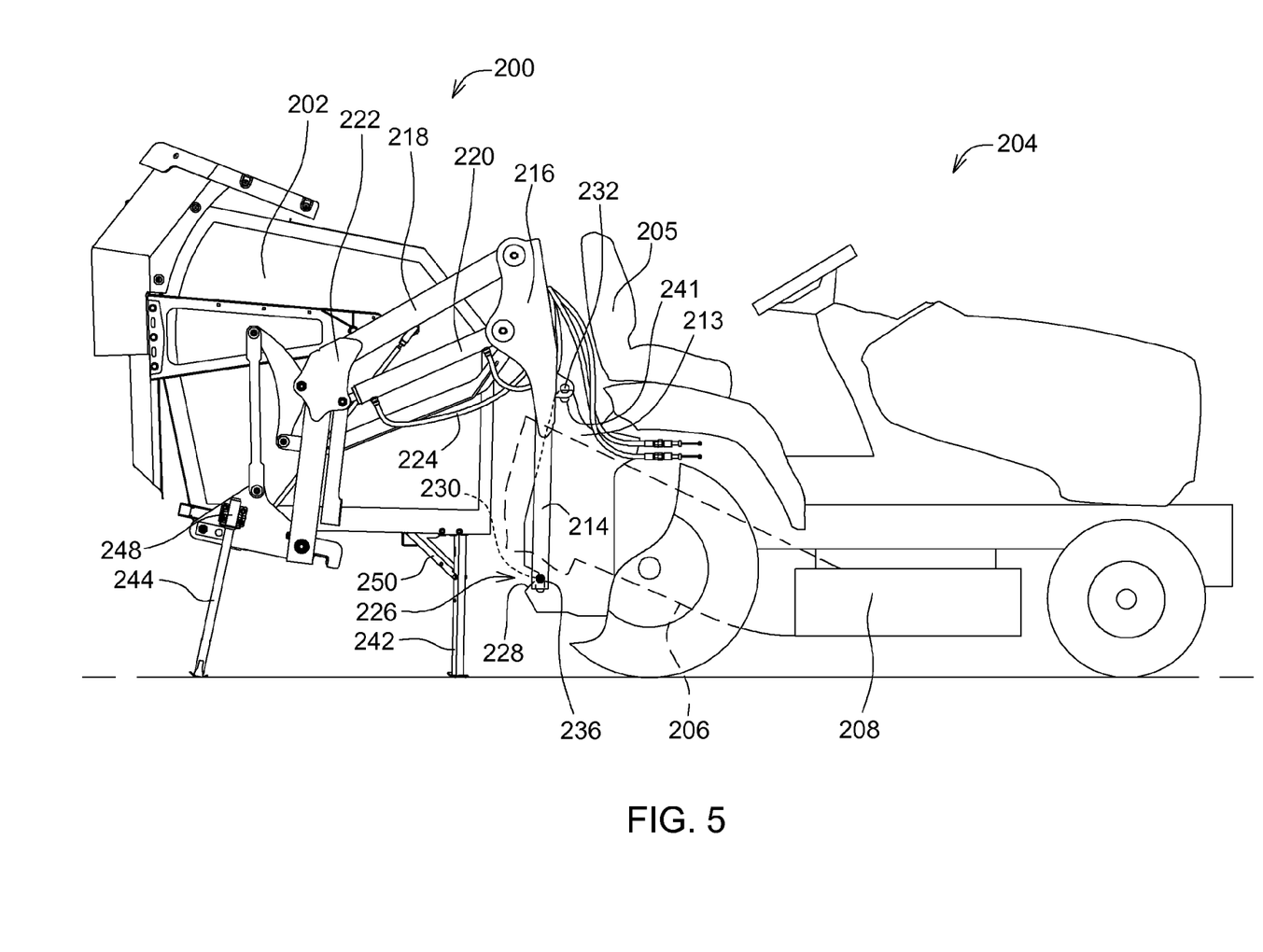
FIG. 5 is a side view of a second embodiment of a material collection parking system between a stowed position and a deployed position.
Figure 6:
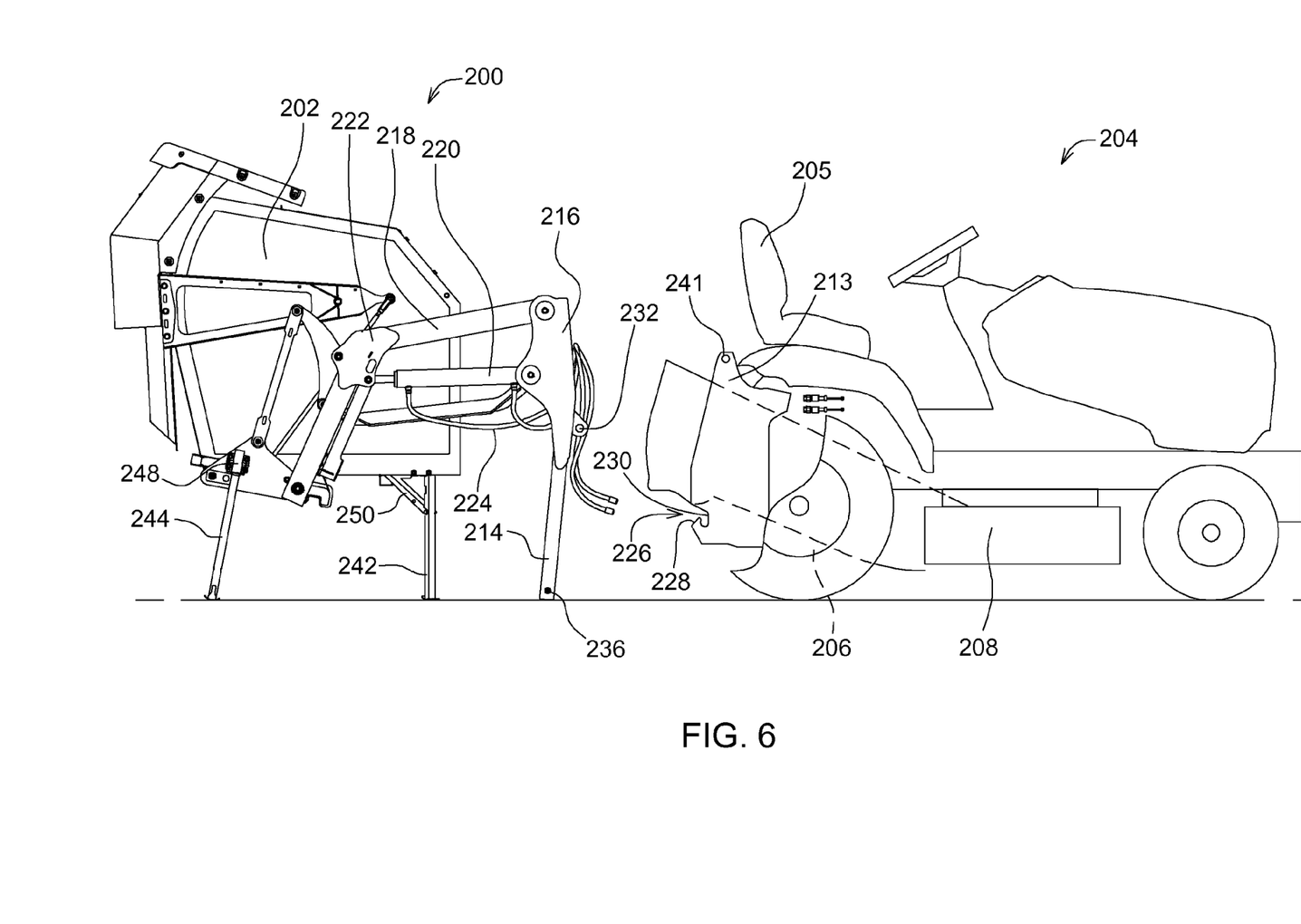
FIG. 6 is a side view of a second embodiment of a material collection parking system in a deployed position.

FIGS. 4-6 show a second embodiment of material collection parking system 200 having a high dump configuration. The material collection system may include hopper 202 that may be attached to and removed from lawn tractor 204. The lawn tractor may include discharge chute 206 that extends rearwardly from mower deck 208 into hopper 202.

In a second embodiment, material collection parking system 200 may include left and right masts 214 behind operator seat 205, left and right boom arms 218 pivotably attached to the masts at vertical locations below the top of operator seat 205, and left and right lift cylinders 220 interconnecting between the masts and boom arms. A single boom arm 218 on each side of the hopper may have a first or upper end pivotably mounted to a bracket 216 near the top of a mast. Each boom arm may be generally L-shaped with a downward bend angle, between about 90 degrees and about 135 degrees, where the boom arm extends rearwardly along the hopper side wall and supports the hopper. In the stowed position, the second or lower end of each boom arm may have a generally vertical or near vertical orientation adjacent the hopper sidewall near the underside of the hopper.

In a second embodiment, a first end of each lift cylinder 220 may be pivotably mounted to bracket 216 on mast 214 below boom arm 218, and a second end of the lift cylinder may be pivotably mounted to bracket 222 on an intermediate portion of the boom arm. The lift cylinders are attached to hydraulic hoses 224 and may be actuated by operator controls to extend the lift cylinders and raise the boom arms and hopper for dumping, or to retract the lift cylinders and lower the boom arms and hopper into the stowed position for grass collection. During grass collection, the masts 214 and L-shaped boom arms 218 are below the top of operator seat 205, providing unobstructed sight lines and good rear visibility for the operator.

In a second embodiment, material collection parking system 200 may include left and right lower pins or transverse rods 236 at a lower front portion of the hopper near the lower ends of masts 214. The rods may be captured in left and right J-shaped slots 226 on a lower portion of rear bracket 213 on the frame of the lawn tractor. Each J-shaped slot may have a rear facing portion 228 and a vertical portion 230. To secure the hopper to the lawn tractor in the stowed position, the lawn tractor may back up until the rods are in the rear facing portion of J-shaped slots 226, and then the hopper may be lowered until the rods are at the bottom of the vertical portion of the J-shaped slots. Additionally, the hopper may be secured to the lawn tractor in the stowed position by left and right upper pins 240 inserted through left and right holes 241 through an upper part of rear bracket 213, and left and right holes 232 provided in the hopper frame.

Figure 9:
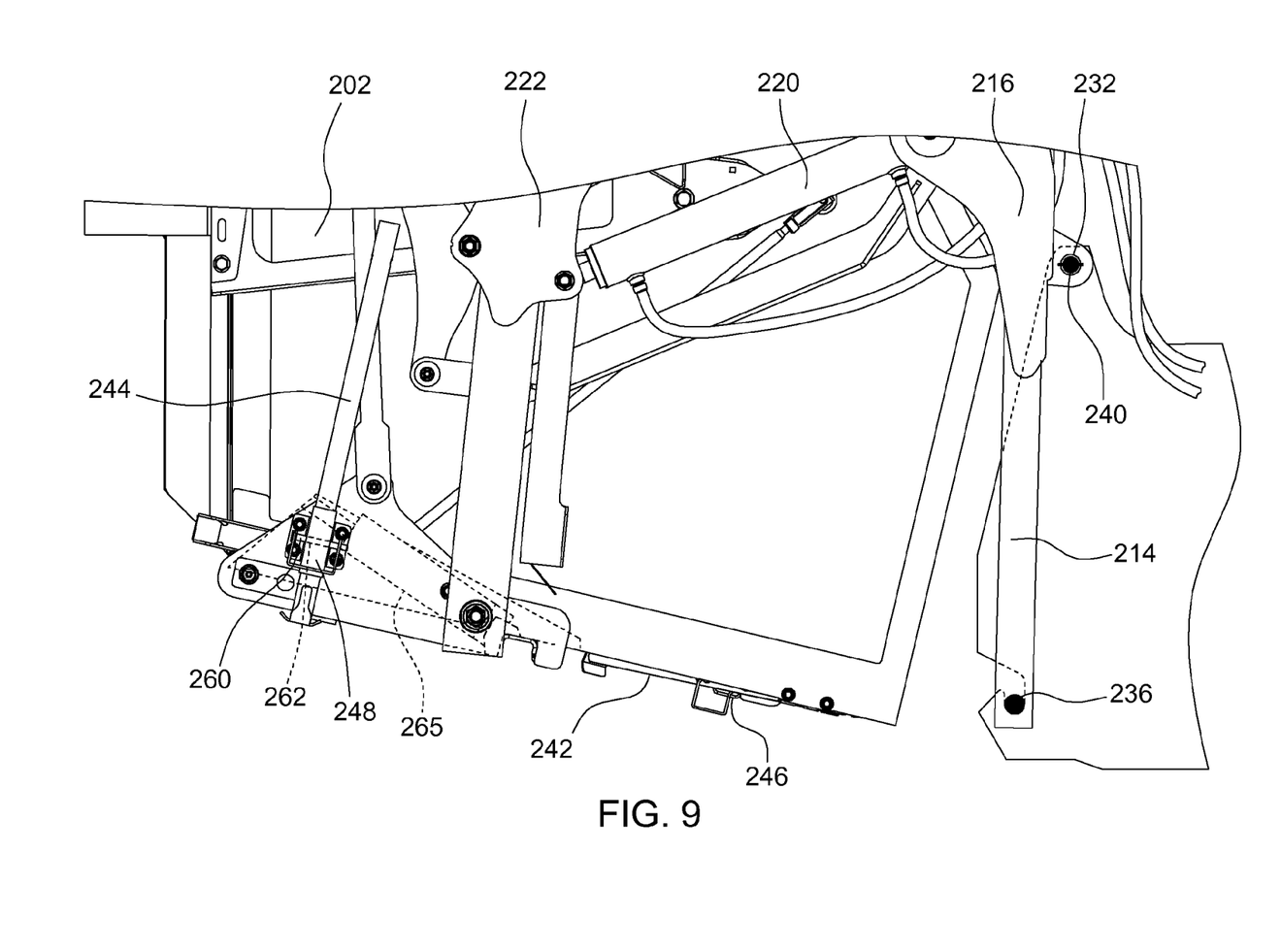
FIG. 9 is a side view showing a lower portion of a second embodiment the material collection parking system in a stowed position.
Figure 10:
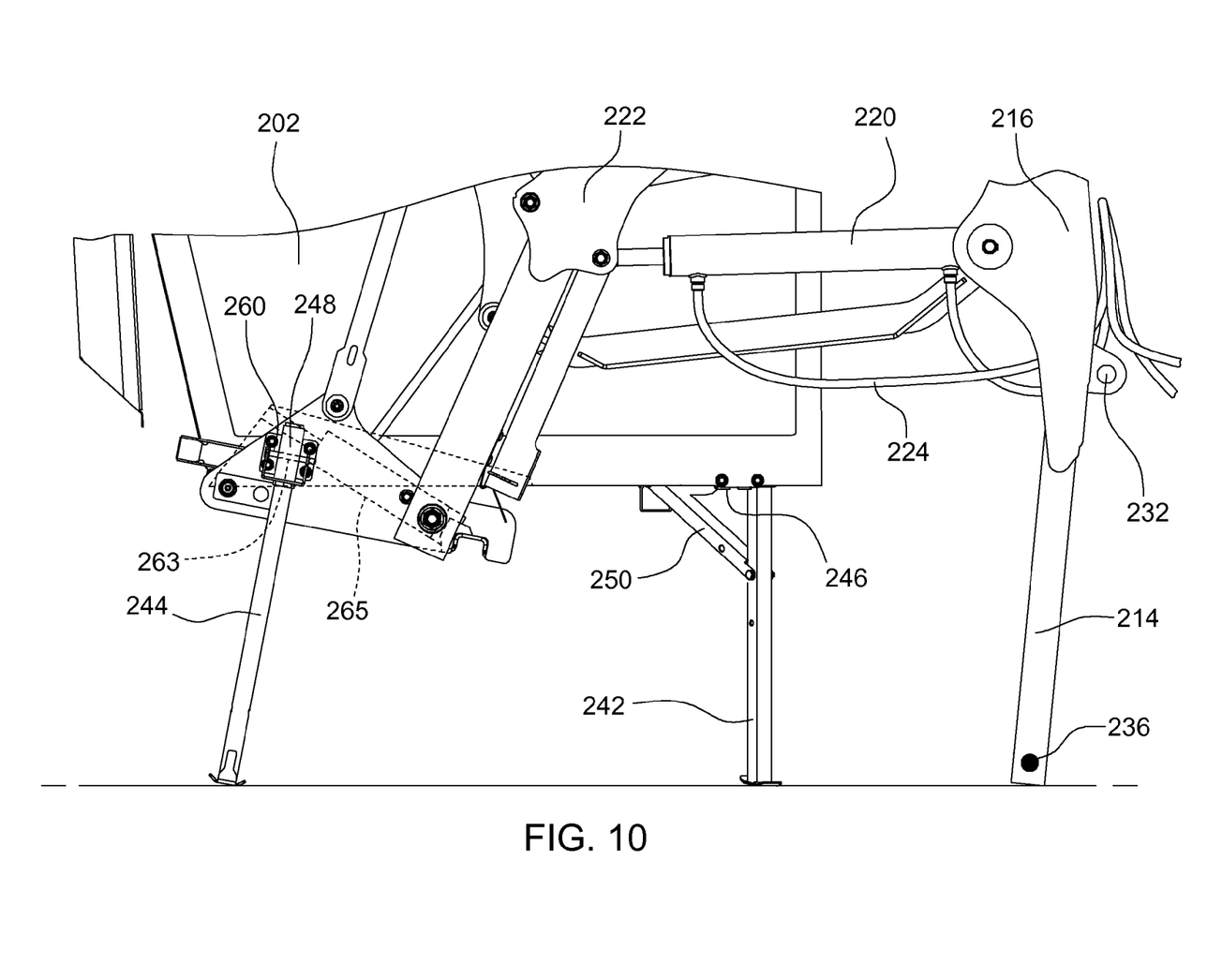
FIG. 10 is a side view showing a lower portion of a second embodiment the material collection parking system in a deployed position.

As shown in FIGS. 9-10, a second embodiment of material collection parking system 200 may include left and right front parking support legs 242 and left and right rear parking support legs 244 attached to the hopper. The rear parking support legs may slide up and down between a stowed position adjacent the hopper left and right side walls, and a deployed position extending down from the hopper side walls to the ground surface. The front parking support legs may be pivoted 90 degrees between a stowed position under the hopper floor, and a deployed position extending down from the hopper floor to the ground surface.

In a second embodiment, the left and right front parking support legs 242 may be mounted under the hopper floor with brackets 246 and front leg supports 250 hinged to the front parking support legs. Each front leg 242 may be held in the stowed position by inserting a pin in a first set of corresponding holes through front leg 242, support 250, and bracket 246. Each front leg 242 may be pivoted 90 degrees and may be held in the deployed position by inserting the pin in a second set of corresponding holes through front leg 242, support 250 and bracket 246. Alternatively, the front parking support legs may be mounted to the hopper side walls.

In a second embodiment, each rear leg 244 may be mounted to the hopper side wall with bracket 248. Each rear leg may be held in the stowed position by inserting pin 260 in hole 262 through rear leg 244 and a corresponding hole in the bracket. Each rear leg 244 may slide downwardly and may be held in the deployed position by inserting pin 260 in hole 263 through rear leg 244 and a corresponding hole in the bracket.

In a second embodiment, material collection parking system 200 may be moved between the stowed position on the rear of the lawn tractor for use during mowing, and the deployed position off the lawn tractor. In the stowed position, the top ends of the masts and boom arms are lower than the top of the operator seat to provide unobstructed rear sight lines for the operator. The left and right lift cylinders 220 may be extended to raise hopper 202. With the hopper raised, pins 252, 260 may be removed from the front and rear parking support legs. The operator may slide the rear parking support legs down to the deployed position, and may pivot the front parking support legs to the deployed position. The pins then may be reinserted. Optionally, hydraulic controls may be used to extend dump cylinder 265 to tip the hopper back slightly (preferably about 10 degrees) before lowering the hopper. The lift cylinder then may be retracted to lower the hopper until front parking support legs 242 and rear parking support legs 244 contact the ground surface. When the hopper is supported by the support legs, upper pins 240 then may be removed from holes 241 in the upper part of the rear bracket and holes 232 in the upper part of the hopper frame. Dump cylinder 265 than may be extended to raise the front of the hopper slightly, moving rods 236 upwardly in the vertical portion 230 of the J-shaped slots. The operator then may drive the lawn tractor forward far enough until rods 236 are out of the rear facing portion 228 of the J-shaped slots. The hydraulic controls then may be used to retract the lift cylinders 220 to lower masts 214 onto the ground surface, before the hydraulic hoses are disconnected.

Having described the preferred embodiment, it will become apparent that various modifications can be made without departing from the scope of the invention as defined in the accompanying claims.

The invention claimed is:
1. A material collection parking system, comprising:
a hopper removably attached to a lawn tractor having an operator seat and a rear discharge chute; the hopper engageable to the lawn tractor by backing up the lawn tractor without raising the hopper;
a pair of masts removably attached to the lawn tractor behind and not extending above a top of the operator seat;
a pair of boom arms supporting the hopper, each boom arm pivotably attached to one of the masts at a vertical position below the top of the operator seat;
a lift cylinder having a forward end attached to each mast below the boom arm and extending rearwardly and downwardly to a rearward end attached to one of the boom arms; and
a pair of rear support legs and a pair of front support legs, each of the legs being independently moveable between a stowed position on the hopper and a deployed position supporting the hopper above the ground surface.
2. The material collection parking system of claim 1 further comprising a pair of J-shaped slots at the rear of the lawn tractor, and a pair of rods on a lower front portion of the hopper that can be captured in a vertical portion of the J-shaped slots.
3. The material collection parking system of claim 1 wherein at least one of the pairs of support legs are held against a sidewall of the hopper in the stowed position.

* * * * *